United States Patent [19]

Brandner

[11] Patent Number: 5,155,300
[45] Date of Patent: Oct. 13, 1992

[54] DEVICE FOR SEALING OFF A CABLE ENTRY HOLE IN A SWITCH BOX

[76] Inventor: Hans Brandner, Artenreitring 1a, D-8240 Schoenau, Fed. Rep. of Germany

[21] Appl. No.: 617,095

[22] Filed: Nov. 23, 1990

[30] Foreign Application Priority Data

Nov. 23, 1989 [DE] Fed. Rep. of Germany ... 8913829[U]

[51] Int. Cl.$^5$ .................................................. H02G 3/22
[52] U.S. Cl. .................................. 174/65 R; 174/151; 248/56
[58] Field of Search .................. 174/65 R, 151, 52.1, 174/53; 248/56

[56] References Cited

U.S. PATENT DOCUMENTS 4,031,312 6/1977 Coleman et al. .................. 174/52.1
4,884,774 12/1989 Rodi et al. ............................ 248/56

FOREIGN PATENT DOCUMENTS 2720936 11/1978 Fed. Rep. of Germany .
3544785 6/1987 Fed. Rep. of Germany .
713389 8/1954 United Kingdom .................. 174/59

Primary Examiner—Leo P. Picard
Assistant Examiner—David A. Tone
Attorney, Agent, or Firm—Flynn, Thiel, Boutell & Tanis

[57] ABSTRACT

A device for sealing off a hole in a wall of a switch box, through which hole a cable is guided into the switch box. A pot-shaped housing can be fastened with its front opening opposing the hole in the wall of the switch box. The housing has on its back side at least one opening for guiding therethrough the cable. The housing comprises two parts with the separating line therebetween going through the cable opening. Each of the two housing parts contains a body of a rubber-like elastic material.

8 Claims, 1 Drawing Sheet

DEVICE FOR SEALING OFF A CABLE ENTRY HOLE IN A SWITCH BOX

FIELD OF THE INVENTION

The invention relates to a device for sealing off a hole in the wall of a switch box, which hole is used to guide a cable therethrough into said switch box.

BACKGROUND OF THE INVENTION

If a cable is supposed to be introduced into a switch box, the wall of the box must have a hole, through which the cable is guided. Such cables often already have a plug, which can for example be molded thereon. Such plugs can be of a substantial size, for example when they are designed as a data plug for a multi-core data cable. When the cable with the plug is supposed to be guided into a hole in the wall of the box, such hole must be designed to be of a corresponding size.

In order to close off the portion of the hole left open after the cable has been guided therethrough, it is today usually covered with two plates, which are placed over the hole on the left and right of the cable, so that such plates abut. The plates have two semicircular recesses so that, when they abut, a circular opening is formed, through which the cable snugly extends.

However, because of the joint between the two plates and the circular opening for the cable, the sealing capability of this prior cover leaves much to be desired. Also the cable is not fixed, so that the plug starts being pulled out of the switch box when only a relatively light pull is exerted on the cable.

The purpose of the invention is to provide a device of the above-mentioned type guaranteeing a high sealing capability and relief against pulling the cable off of the plug.

SUMMARY OF THE INVENTION

A device for sealing off a hole in a wall of a switch box, through which hole a cable is guided into the switch box. A pot-shaped housing can be fastened with its front opening opposing the hole in the wall of the switch box. The housing has on its back side at least one opening for guiding therethrough the cable. The housing comprises two parts with the separating line therebetween going through the cable opening. Each of the two housing parts contains a body of a rubber-like elastic material.

A switch box according to the invention is any switching device arranged in a box, thus for example a switch casing or a switchboard.

The cable is enclosed with the rubber-like elastic material, with which the two housing parts of the device of the invention are filled. In this manner the cable is securely sealed off and at the same time fixed against pulling from the outside. Foam rubber or plastic foam is preferably used as the rubber-like elastic material.

The two housing parts are fixedly connected with one another, for example by being screwed together.

In order to better fixedly secure the cable, it is advantageous to provide a bracket on the inside of one of the two housing parts, with which bracket the cable is fixedly fastened.

In order to be able to use the device of the invention to guide several cables through a common hole in the wall of the box, the housing has preferably several openings in its back side, through which openings the separating line goes. Any openings not being used can be closed off by blind plugs.

In order to be able to quickly fasten the housing on the wall of a switch box and in order to be able to quickly release said housing from the wall of the switch box, it is advantageous to provide at least one peg on the outside of each of the opposite side walls of the housing (e.g. to provide at least one peg on each housing part) and to mount hooks pivotally with respect to the box, which hooks can grip over the pegs.

The installation of the device of the invention is further simplified when opposite the peg on the one housing part there is a peg on the other housing part and hooks grip over the two pegs, which hooks are arranged on a pivot bar, which is pivotably located with respect to the switch box.

BRIEF DESCRIPTION OF THE DRAWINGS

The invention will be discussed in greater detail hereinafter in connection with the drawing, in which.

DETAILED DESCRIPTION

The inventive device has a pot-shaped, rectangular housing 1, which is made in two parts. A separating plane extends through the center of the housing, namely in longitudinal direction of the housing 1, to form two housing halves 2 and 3 illustrated in detail in FIG. 1.

Figure 2:
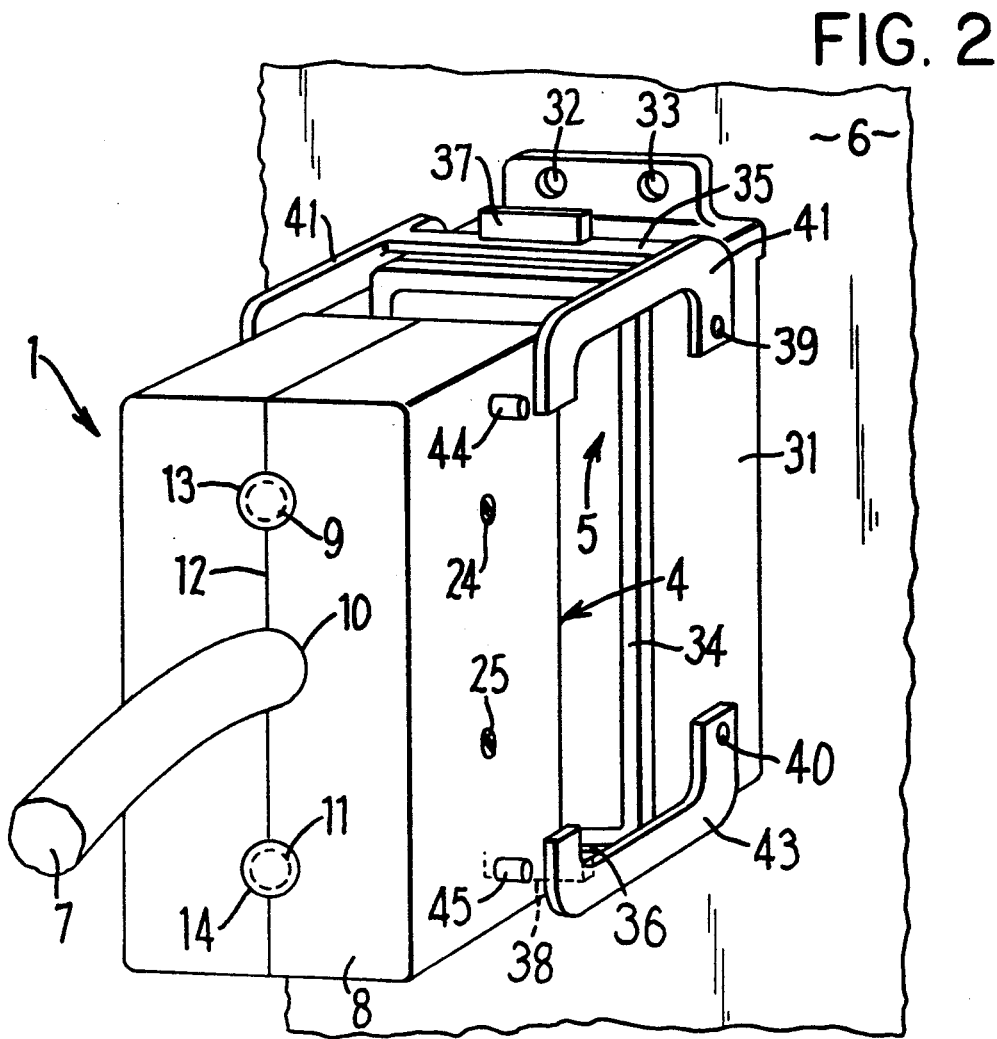
FIG. 2 is a pictorial view of the device according to FIG. 1 in an assembled state prior to fastening on an adjacent switch-box wall.

In FIG. 2, the housing 1 is located with its front opening 4 opposing a hole 5 in the wall 6 of a switch box (not fully shown), in order to guide a cable 7 with a plug (not shown) through the wall 6 into the switch box.

The housing 1 has three openings 9 to 11 in its back side 8. The separating plane, defined by the corresponding separating line 12, goes through the center of the openings 9 to 11. The openings 9 and 11, here not being used, are closed off with blind plugs 13 and 14.

Figure 1:
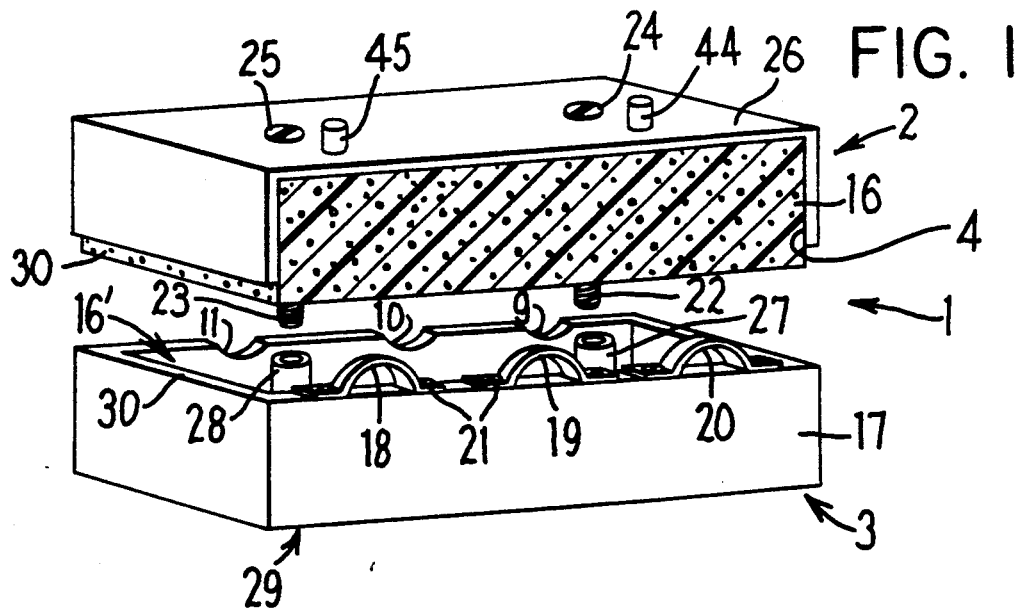
FIG. 1 is a pictorial view, taken from the front, of a device embodying the invention, with the housing halves separated from one another.

According to FIG. 1, each housing half 2, 3 is filled with a body of rubber-like elastic material, for example a respective compressible resilient foam block. These compressible foam blocks can project toward each other beyond their respective housing halves, as illustrated by projection of the foam block 16 in FIG. 1. The foam block in the housing half 3 is not shown in FIG. 1 for drawing clarity, namely to avoid hiding structure hereafter described within the housing half 3, but its location is indicated generally at 16'.

The housing half 3, unlike the half 2, has a wall 17 (FIG. 1) closing its front side. The wall 17 has a free edge which faces the housing half 2. Three brackets 18 to 20 are secured by screws 21 to such free edge. When the cable 7 has been placed into the respective bracket (for example the bracket 19 with the cable 7 in the center opening 10 as in FIG. 2), such bracket is tightened to fix the cable 7 to the housing 1 and, with housing 1 fixed to the switch box as hereafter discussed, relieve the plug (not shown) in the switch box from tension applied through the cable 7 on said plug.

The housing halves 2, 3 are held together by screws 22, 23, the heads 24, 25 of which abut the outside of the base 26 of the housing half 2. The screws 22, 23 project through the foam block 16 in order to engage nuts 27, 28 in the form of sleeve-shaped bosses protruding fixedly from the base 29 of the housing half 3 through the foam block 16' to the screws 23, 24, respectively.

The housing part 2 and the housing part 3, including the wall 17 and pegs 44, 45 described in greater detail hereinafter, each consist of one cast, or molded, part. It is also possible for the nuts 27, 28 to be part of the casting which forms the housing part 3. Projections, defining the nuts 27, 28, are formed in the casting on the inside face of the base 29 and threads are cut in these projections.

A sealing ring, for example an 0-ring, not shown, may be sunk into a groove, not shown, in one of the opposed edges 30 (FIG. 1) of the two housing parts 2, 3 to seal off the separating line 12 between the two housing parts 2, 3. The sealing off of the hole 5 in the box wall is done by the foam blocks 16, 17, which are pressed against one another and which at the same time fix the cable 7 with the bracket 19.

In order to fasten the housing 1 on the box wall 6, a rectangular frame-shaped part 31 is fastened at its top end by means of screws 32, 33 to the box wall 6 and surrounds the hole 5. Two further screws (not shown) fasten the bottom end of the frame-shaped part 31 to the box wall 6. The housing 1 and frame-shaped part 31 are similar in size and shape at their opposed ends. The frame-shaped part 31 has a seal in the form of a perimeter rubber 34 on its rear edge, namely its edge facing the housing 1 to effect a continuous perimeter seal therebetween, when the front of the housing 1 is pressed forward against the perimeter rubber 34.

Transverse bars 35, 36 grip over the oppositely positioned shorter sides (toward bottom sides in FIG. 2) of the rectangular, frame-shaped part 31, which bars have respective operating plates 37, 38. The bars 35, 36 are hinged pivotally about respective axes 39, 40. The axes 39, 40 are parallel to the box wall 6 and to the shorter sides of the frame-shaped part 31. The axes 39, 40 extend through the longer sides (left and right sides in FIG. 2) of the rectangular, frame-shaped part 31.

Paired upper and lower hooks 41 and 43 are fixed on the respective bar 35 and 36 and flank laterally the frame-shaped part 31. Furthermore, each housing part 2, 3 has pegs 44, 45 fixed on the outside of its longer sides. The hooks 41, 43 are pivotable to grip over the pegs 44, 45, to fix the housing 1 on the frame-shaped part 31 and thus on the box wall 6. The hooks 41, 43 are held releasably in that position by any convenient means, such as sufficient pivot friction at the pivot axes 39, 40.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A device for sealing off a hole in a wall of a switch box while guiding a cable into the switch box, comprising a rectangular housing having a front opening, the housing being fastenable with its front opening over the hole in the wall of the switch box, the housing having a back side pierced by at least one opening for guiding therethrough the cable, the housing comprising two parts, the separating line therebetween going through the cable opening, each of the two housing parts containing therein a body of a rubber-like elastic material; means to fasten the housing on the box wall, such means comprising at least one peg on each housing part, said pegs being located on opposite outer sides of the housing, such means further comprising hooks to grip over ones of the pegs, said hooks being pivoted on axes fixed with respect to the wall of the switch box.

2. A device according to claim 5, including a pivot bar pivotally carried on said axis fixed with respect to the wall of the switch box, one of said hooks being fixed on each of the two ends of said pivot bar.

3. A device for sealing off a hole in a wall of a switch box while guiding a cable into the switch box, comprising a hollow, multi-sided housing of rectangular form, said housing having at least one front opening, said housing being fastenable with its front opening facing the hole in the wall of the switch box, said housing having a back side, means defining at least one cable opening piercing said back side of said housing for snugly guiding a cable through said back side and into the hollow interior of said housing, said cable opening being of substantially circular form corresponding to the circular cross-section of a conventional cable, the two housing parts meeting along a separating line going through said cable opening, the housing containing therein at least one body of a rubber-like elastic material.

4. A device according to claim 3 including at least one bracket mounted on the inside of said housing for fixing the cable to the housing, said bracket being curved and having a concave surface to receive the convex perimeter of a cable.

5. The apparatus of claim 4 in which the curved bracket is substantially C-shaped and has substantially coplanar end tabs for fixedly locating said bracket with respect to said housing, said tabs of said bracket being engageable with said housing, means associated with said tabs for clampingly engaging the C-shaped portion of said bracket with a cable extending through said housing and beyond said front opening and said cable opening in said back side.

6. A device according to claim 3 in which at least one said body of rubber-like elastic material is formed of resilient foam.

7. The apparatus of claim 3 in which one said housing part has fixed internally thereof at least one sleeve-shaped boss protruding fixedly from a base of such housing part toward the other housing part and being internally threaded to receive a screw extending into the housing toward such boss from outside a base of the other housing part, said housing parts being of open box-like form, opening toward each other, the bases of said housing parts being opposed and substantially parallel and extending forward from the back side of the housing.

8. The apparatus of claim 3 in which several such cable openings pierce the back side of said housing for snugly guiding respective cables through the back side and into the housing, and including blind plugs insertable into respective ones of said cable openings, in the absence of a cable therein, for closing off said openings and thereby protecting the interior of said housing against entry of unwanted foreign substances through one of said openings unoccupied by cables.

* * * * *

UNITED STATES PATENT AND TRADEMARK OFFICE
CERTIFICATE OF CORRECTION

PATENT NO. : 5 155 300

DATED : October 13, 1992

INVENTOR(S) : Hans BRANDNER

It is certified that error appears in the above-identified patent and that said Letters Patent is hereby corrected as shown below:

Column 4, line 10; replace "Claim 5" with ---Claim 1---.

Signed and Sealed this

Second Day of November, 1993

*Attest:*

BRUCE LEHMAN

*Attesting Officer*     *Commissioner of Patents and Trademarks*